(12) United States Patent  (10) Patent No.: US 7,585,457 B2
Zhang et al.  (45) Date of Patent: Sep. 8, 2009

(54) SEPARATION PROCESS

(75) Inventors: Deliang Zhang, Hamilton (NZ);
Gorgees Adam, Hamilton (NZ); Jing Liang, Mt. Albert (NZ)

(73) Assignee: Titanox Development Limited (NZ)

( * ) Notice: Subject to any disclaimer, the term of this patent is extended or adjusted under 35 U.S.C. 154(b) by 280 days.

(21) Appl. No.: 10/522,054

(22) PCT Filed: Jul. 22, 2003

(86) PCT No.: PCT/NZ03/00159

§ 371 (c)(1),
(2), (4) Date: Aug. 29, 2005

(87) PCT Pub. No.: WO2004/009857

PCT Pub. Date: Jan. 29, 2004

(65) Prior Publication Data

US 2006/0011273 A1    Jan. 19, 2006

(30) Foreign Application Priority Data

Jul. 22, 2002  (NZ) .................................. 520369

(51) Int. Cl.
*C22C 32/00* (2006.01)
(52) U.S. Cl. .......................................... 419/19; 75/232
(58) Field of Classification Search ................. 75/351, 75/232; 419/19
See application file for complete search history.

(56) References Cited

U.S. PATENT DOCUMENTS

| 3,537,695 | A | | 11/1970 | Robinson et al. |
| 3,840,364 | A | | 10/1974 | Flemings et al. |
| 4,921,531 | A | * | 5/1990 | Nagle et al. .................. 75/351 |

FOREIGN PATENT DOCUMENTS

| WO | WO 99/09227 | 2/1999 |
| WO | WO0107672 | 2/2001 |

OTHER PUBLICATIONS

Size Enlargement, Perry's Chemical Engineers' Handbook 6$^{th}$ Edition, pp. 8-60 through 8-69, McGraw-Hill Book Company, N.Y. (1984).
JP 49/045965, Sumitomo Electrical Industries, Ltd., Dec. 7, 1974.
JP 55/145102, Tamagawa Kikai Kinzoku KK, Nov. 12, 1980.
JP 55/145135, Tamagawa Kikai Kinzoku KK, Nov. 12, 1980.
JP 55/041948, Nippon Tungsten KK, Mar. 25, 1980.
CN 1377852, Inst Chem Metallurgy Chinese Acad Sci, Nov. 6, 2002.

* cited by examiner

*Primary Examiner*—George Wyszomierski
*Assistant Examiner*—Weiping Zhu
(74) *Attorney, Agent, or Firm*—Andrus, Sceales, Starke & Sawall, LLP

(57) ABSTRACT

A method of separating components from a metal based composite, the method including the steps of increasing the size of a component to be separated and separating the increased sized component from the other components of the composite.

45 Claims, 1 Drawing Sheet

(a)

(b)

(a)

(b)

SEPARATION PROCESS

CROSS-REFERENCE TO RELATED APPLICATIONS

Figure 1:
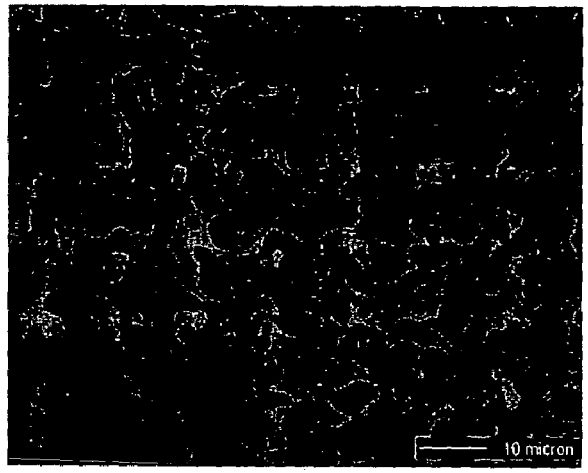
Figure 1:
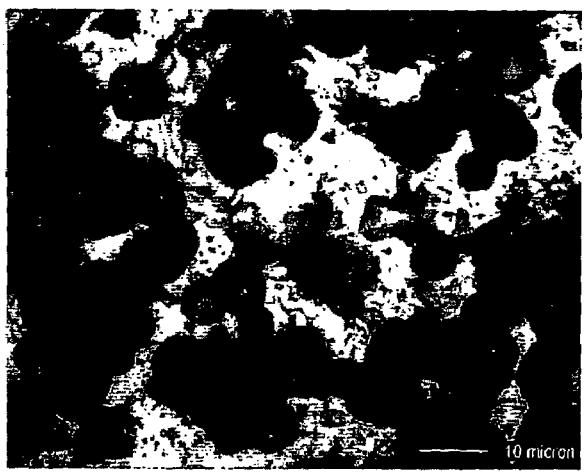

This application is the U.S. national stage application of International Application PCT/NZ2003/000159, filed Jul. 22, 2003, which international application was published on Jan. 29, 2004, as International Publication WO 2004/009857 in the English language. The International Application claims priority of New Zealand Patent Application No. 520369, filed Jul. 22, 2002.

TECHNICAL FIELD OF THE INVENTION

This invention relates to a separation process.

In particular, this invention relates to a method of separation of a metal component from a composite material including that metal.

BACKGROUND ART

Titanium alloys have been widely used in making components for aircraft, medical implants and chemical processing machinery and structures.

Titanium alloys can also be used to replace steel in making automotive components, but this application has been severely limited by the cost issues. This high cost is largely a result of expensive batch processes that are used to recover titanium from its mineral concentrates, and the technical difficulties associated with melting and alloying titanium.

The conventional titanium production process, the Kroll process, involves the reaction of $TiO_2$ and carbon, in the form of coke, under chlorine gas at temperatures of 800° C. to form $TiCl_4$ and carbon monoxide.

The titanium chloride ($TiCl_4$) produced in the reaction exists as a liquid and has to be purified by distillation. The liquid is introduced into a furnace holding a magnesium melt at 680° C. to 750° C. to facilitate the formation of magnesium chloride ($MgCl_2$) and pure titanium. $MgCl_2$ is a gas, while titanium is a solid sponge. The sponge is purified by distillation or leaching using hydrochloric acid. The magnesium chloride can be recycled through an electrolysis process. The titanium sponge that is formed by this process can then be further processed to produce commercial purity titanium or titanium alloys by vacuum arc melting or other such melting methods.

If titanium or titanium alloy powder is needed, the titanium or titanium alloys need to be heated to a high temperature above (1650° C.) to produce titanium/alloy melt. This is atomized into liquid droplets which in turn solidifies as powders.

The limitations of this process include its complexity and the use of chlorine and magnesium. The process involves several high temperature steps where a high amount of energy is needed. This contributes to the high cost of titanium and titanium alloys. The use of chlorine makes the process environmentally unfriendly. Magnesium metal is expensive, so the use of magnesium in the process also contributes to the high cost of titanium. The result of this process is that the cost of the titanium alloy powder is in the range of US $40 per kilogram.

U.S. Pat. No. 6,264,719 (Zhang et al.) discloses both a titanium alloy based dispersion-strengthened composite and a method of manufacture of the same. This patent discloses the use of dry high-energy intensive mechanical milling in the process of producing titanium based metal matrix composites (MMC).

MMCs are composites of a tough conventional engineering alloy and a high strength second phase material, which may be an oxide, nitride, carbide or intermetallic. Oxide Dispersion Strengthened (ODS) alloys occur at one end of the spectrum of MMCs. These are composites of a tough engineering alloy and a fine dispersion of an oxide. Typically, in order to obtain the required dispersion, there must be no more than 10% volume fraction of the oxide second phase, which may have a size of 10's of nm.

While U.S. Pat. No. 6,264,719 discloses a method of producing titanium based MMCs at a reduced cost, it does not disclose a method for separating out the unwanted components within the MMC, thus adjusting the level of certain components in the composite to more desirable concentration. The ability to use such a process to recover metal components including metals other than Ti would also be an advantage.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, those references do not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more of the steps in a method or process.

OBJECT OF THE INVENTION

It is an object of the present invention to address problems in the prior art, or at least to provide the public with a useful choice.

Further aspects and advantages of the present invention will become apparent from the ensuring description which is given by way of example only.

SUMMARY OF THE INVENTION

According to one aspect of the present invention there is provided a method of separating components from a metal based composite, the method including the steps of increasing the size of a component and separating the increased sized component from the other components of the composite.

Preferably the metal based composite is heated to a temperature of between about 1500° C. and about 1650° C.

Preferably the metal based composite is held at a temperature of between about 1500° C. and about 1650° C. for a time of between about 0.5 hours and about 10 hours.

Preferably the component increases in size to between about 15 μm and about 100 μm.

Preferably the metal based composite is a metal matrix composite made up of at least two components where one is a metal.

Preferably the metal is titanium, yttrium or copper. Most preferably it is titanium.

Preferably the metal based composite is a combination of a metallic base and a reinforcing non-metallic component.

Preferably the non-metallic component is a ceramic material.

Preferably the metal based composite is a metal-ceramic composite where the major component makes up greater than about 50% of the composite.

Preferably the materials or phases that make up the metal based composites include metallic phases, intermetallic phases, oxides, nitrides, carbides or silicates.

Preferably the metallic phases, intermetallic phases and oxides include Ti(Al,O), Ti$_3$Al(O) and TiAl(O) and Al$_2$O$_3$. For ease of reference throughout the specification, Ti(Al,O), Ti$_3$Al) and TiAl(O) will now be collectively referred to as Ti$_x$Al$_y$(O). This term should not be seen as limiting.

Preferably the component that increases in size in the metal based composite is Al$_2$O$_3$.

Preferably the mean particle size of the Al$_2$O$_3$ is increased by the heat treatment which brings about coarsening of the Al$_2$O$_3$ particles.

Preferably the composite is crushed and/or milled following treatment to decrease the size of a component in comparison to other components.

Preferably the milling occurs in an inert environment such as under argon or a vacuum.

Preferably the milling time is limited to minimise reduction of the increased size of the component.

Preferably the powder is mixed with surfactant and water to produce a suspension.

Preferably separation of the components is achieved by sieving, sedimentation, electrophoresis, electrostatic methods, chemical leaching, or the like.

In another aspect the invention provides a titanium rich powder produced by the process described above.

Preferably the Al$_2$O$_3$ content of the titanium rich powder is less than 30% and more preferably less than 15%.

Preferably the oxygen content in the titanium phase is less than 1.5 atomic percent.

Preferably the separation process is repeated to achieve a powder with a volume fraction of Al$_2$O$_3$ of less than about 30%.

Preferably the powder is reacted with a reducing agent to reduce the oxygen content in the metal phase to below about 1.5 atomic percent.

Preferably the Al$_2$O$_3$ volume fractions in the powder is reduced to below about 10% and the powder is reacted with a rare earth metal.

DRAWING

Further aspects of the present invention will become apparent from the following description which is given by way of example only and with reference to accompanying drawing in which:

FIG. 1 The microstructure of T(Al,O)/Al$_2$O$_3$ composite produced by pressure less sintering of the Al/TiO$_2$ composite powder at different temperatures (a) 1550° C. for 3 hours and (b) 1650° C. for 4 hours. The bright phase is Ti(Al,O) and the dark phase is Al$_2$O$_3$.

DETAILED DESCRIPTION OF THE INVENTION

The invention of the present application is broadly directed to the separation of metals from composite materials. While there are known methods for achieving this, these methods suffer from some disadvantages and alternatives are needed.

For example, the combustion reaction used to produce Ti$_x$Al$_y$/Al$_2$O$_3$ composite from aluminium and the titanium dioxide powders, as described in U.S. Pat. No. 6,264,719 results in the formation of Al$_2$O$_3$ particles and a titanium rich metallic or intermetallic phase.

The titanium metallic or intermetallic phase is either Ti(Al, O) which is a solid solution of Al and oxygen in titanium, or Ti$_3$Al(O) or TiAl(O) which is a titanium aluminide intermetallic compound containing dissolved oxygen, or a mixture of these phases.

It is often a disadvantage of the method disclosed in U.S. Pat. No. 6,264,719 that the volume fraction of the Al$_2$O$_3$ component in the Ti$_x$Al$_y$/Al$_2$O$_3$ composite is undesirably high, being greater than about 45%. While Al$_2$O$_3$ is a desired component of a metal-ceramic composite, it is often desirable to reduce the volume fraction of Al$_2$O$_3$ to a low level of less than about 30% and more preferably 15%.

By reducing the volume fraction of the Al$_2$O$_3$ in the composite, mechanical properties of the metal-ceramic composites such as ductility and fracture toughness can be improved.

More importantly, by reducing the volume fraction of the Al$_2$O$_3$ to less than 15% or more preferably 10%, the Ti$_x$Al$_y$/Al$_2$O$_3$ powder can then be further reduced by using calcium, calcium hydride or other suitable reductants to the titanium alloy in titanium aluminide, thus providing an alternative route for producing these high value titanium base metallic materials. This process can also be used to separate metals, such as copper or yttrium from composites including oxides of those metals (eg Cu$_2$O; Y$_2$O$_3$) for example.

It has been found that the mean particle size of the Al$_2$O$_3$ is increased by heat treatment, which brings about coarsening of the Al$_2$O$_3$ particles. This can be seen in FIG. 1.

With reference specifically to titanium composites and FIG. 1, by heating the Ti$_x$Al$_y$/Al$_2$O$_3$ bulk composite to a temperature range of between about 1500° C. and about 1650° C. and holding at the temperature for a set period of time, ranging from about 0.5 to about 10 hours, the Al$_2$O$_3$ particles are significantly coarsened. The Al$_2$O$_3$ particle size increases to the range of approximately 15-100 μm. Temperatures over 1650° C. can also be used as will be readily apparent but can be impractical in practice. The top and bottom limit will be readily discernable on testing.

The term 'particle' in accordance with the present invention should be understood to mean the individual embedded particles that make up a material and is a term known to someone skilled in the art. The shape of a particle within the solid is usually controlled by the presence of surrounding matrix and the application of heat to the material will allow the particles to coarsen, or grow in size.

It is an advantage of the present invention that the mean particle size of Al$_2$O$_3$ can be increased. By coarsening the Al$_2$O$_3$ particles in the composite, the material becomes more favourable for the later separation steps. This is contrary to conventional wisdom as the coarsening of the embedded particles within a composite is usually undesirable, as coarsened particles can decrease the overall strength of the final product.

In order to facilitate the separation of the increased sized Al$_2$O$_3$ from the Ti$_x$Al$_y$(O), the composite with the coarsened Al$_2$O$_3$ particles is crushed and milled to produce a Ti$_x$Al$_y$(O)/Al$_2$O$_3$ powder. The majority of the powder particles (greater that 85% in volume) will be either Ti rich metallic particles or $Al_2O_3$ particles. The milling step will preferably be adjusted to reduce the size of the Ti rich metallic particles while minimising the size reduction of the other component (ie $Al_2O_3$).

In some embodiments, the milling of the composite is undertaken under an inert environment. This could include an inert atmosphere such as argon, or a vacuum.

In preferred embodiments, the inert atmosphere is argon.

The milling condition needs to be controlled in such a way that the composite microstructure is broken into $Al_2O_3$ and $Ti_xAl_y(O)$ powder particles.

In preferred embodiments the milling time is limited in order to prevent the milling of the $Al_2O_3$ (or other undesirable component) beyond the preferred particle size.

The preferred particle size of the $Al_2O_3$ is approximately the size of the $Al_2O_3$ particles produced after grain coarsening. In other words, the milling and crushing processes will have a minimal effect on the $Al_2O_3$ size. It is a feature of the $Al_2O_3$ particle that after coarsening in the structure of the particle is often a single crystal. A single crystal material lacks or has no microstructure, including grain boundaries. It is a feature of single crystal that the lack of defects increases the overall strength and single crystal $Al_2O_3$ is therefore hard and resists crushing. The metallic or intermetallic phase on the other hand is easily milled in comparison the $Al_2O_3$ and the average particle size of each component is therefore significantly different after milling.

In some embodiments the separation of the $Al_2O_3$ could be undertaken by means of a sieving or the like after milling of the metallic-ceramic composite, however, this is listed by way of example only and should not be seen to be limiting in any way as the $Al_2O_3$ Ti rich components could also be separated by using for example electrophoresis, electrostatic techniques (as electrosorption) or by chemical leaching methods.

In the preferred embodiments the separation of the $Al_2O_3$ from other components of the crushed $Ti_xAl_y(O)/Al_2O_3$ powder is by sedimentation of the components in a liquid.

To prepare the suspension for sedimentation, the crushed $Ti_xAl_y(O)/Al_2O_3$ powder is milled together with a mixture of water (solvent) and surfactant to ensure good coating of each powder particle by the water/surfactant molecules, creating a slurry. As an alternative, the powder can be mixed with the surfactant prior to mixing with the water (or other suitable liquid/solvent) to create the slurry.

In preferred embodiments the water/surfactant mixture has a pH in the range of 4-10. However, it should be appreciated that this is listed by way of example only and should not be seen to be limiting in any way.

In some embodiments the surfactant is either sodium dodecyl sulphate (SDS) ($C_{12}H_{25}SO_4^-Na^+$) or polyacrylic acid ([—$CH_2CH(CO_2H)$—]n), although these are listed by way of example only and should not be seen to be limiting in any way.

In preferred embodiments, the surfactant is sodium dodecyl sulphate (SDS) ($C_{12}H_{25}SO_4^-Na^+$).

In other preferred embodiments, the ratio of surfactant to powder is typically 1:10 by weight.

The coating of the surfactant onto the powder particles provides a number of advantages. While the sizes of the particles rich in different components of the composite have been differentiated by the grain coarsening process and further milling processes, if they were simply suspended in water (or a similar solvent), the sedimentation rate would be too high to differentiate the sedimentation times of the two types of powder particles. The addition of the surfactant assists suspension of the small particles in the liquid for a longer time and ensures the break up of the agglomerate and separation of the particles, and thus allows the larger, heavier $Al_2O_3$ rich particles to fall, as a sediment, well ahead of the smaller $Ti_xAl_y(O)$ rich particles.

Once the milled composite is sufficiently coated, the slurry can then be mixed with a quantity of liquid to make a suspension with a preferred powder concentration.

In some embodiments, the powder concentration in the suspension is 5-20 g/liter.

In preferred embodiments, the powder concentration in the suspension is 10-15 g/liter.

It should be appreciated that the water in which the powder is suspended could also be a water based solution, although these are listed by of example and should not be seen to be limiting. It is, however, preferred that the suspending agent is water.

The suspension can then be poured into a column of height ranging from 0.3 m to 10 m and allowed to settle. In preferred embodiments, the settling time ranges from 30 minutes to 4 hours.

After the settling for a period of time, the suspension, which now mainly contains $Ti_xAl_y(O)$ rich powder, is taken out of the column and the solid powder is separated from the liquid by filtering, centrifuge separation, or other typical liquid/solid separation methods to produce a $Ti_xAl_y(O)$ rich powder. The sediment mainly contains $Al_2O_3$ rich powder.

It should be appreciated that while the sediment contains $Al_2O_3$, it is only rich in this component, other components will be present. The milling process will produce components of differing mean particle size, so there will still be some $Al_2O_3$ in the suspension as well.

The $Ti_xAl_y(O)$ rich powder produced from the first round of column sedimentation typically contains 20-40 volume % $Al_2O_3$. To further reduce the volume fraction of the $Al_2O_3$ in the powder, the powder can be compacted sintered and coarsened to produce a $Ti_xAl_y(O)/Al_2O_3$ composite again and crushing, wet milling, mixing with a liquid and column sedimentation cycle can be repeated.

It should be appreciated that this process cycle may be repeated multiple times to reduce the volume fraction of $Al_2O_3$ to a level typically in the range of 10-20%.

It should also be appreciated that the $Al_2O_3$ in the $Ti_xAl_y(O)$ rich powder may also be reduced by using other separating means such as electrophoresis or magnetic separation or the like, however these are listed by way of example only and should not be seen to be limiting.

In another embodiment of the present invention, $Ti_xAl_y(O)$ rich powder which has a volume fraction of $Al_2O_3$ preferably less than about 15% can be further reduced by mixing with calcium, calcium hydride or other reductants and heated to facilitate the reaction between the $Al_2O_3$ and the reductant to consume the majority of the $Al_2O_3$, and between $Ti_xAl_y(O)$ and the reductant to reduce the dissolved oxygen content in the $Ti_xAl_y(O)$ phase.

For instance, as by product of these reactions, the calcium oxide phase can be leached out using mild acids such as formic acid, acetic acid or the like, however, these are by way of example only and should not be seen to be limiting. In this way, a Ti—Al alloy or $Ti_xAl_y$ compounds containing less than 1.5 atomic percent of dissolved oxygen can be produced.

It is an advantage to be able to produce a titanium based alloys or intermetallic compounds with an oxygen content below 1.5 atomic %, as dissolved oxygen has a detrimental effect on the mechanical properties of these materials, and thus reduces their values accordingly.

Alternatively, the $Ti_xAl_y(O)$ rich powder containing less than 10 volume percent $Al_2O_3$ can be further mixed with some rare earth metals such as yttrium and cerium and sintered to allow the reaction of the rare earth metals with $Al_2O_3$ and $Ti_xAl_y(O)$ to form composites consisting $Ti_xAl_y$ with a low dissolved oxygen content (less than 1.5 atomic percent) and particles of rare earth oxides.

The addition of rare earth metals to the $Ti_xAl_y(O)$ rich powder allows the production of high value specialised materials with certain desirable features depending upon the rare earth metal added.

The term 'rare earth metal' is a term known to someone skilled in the art and refers to metals that appear in the lanthanide series of the periodic table of elements.

While the starting materials required to produce the final $Ti_xAl_y(O)$ rich composite, being $TiO_2$ powder, Al powder and other metal or metal oxide powders, should have purity levels of at least 98.5% to ensure the purity of the titanium alloys produced, it should be appreciated that in some cases, starting materials of lower purity, such as titaniferous smelter slag can be used. This slag typically contains 33 percent titanium oxides on a molar basis.

It should be appreciated that a lower purity starting material may compromise the quality of the titanium based alloys or composites that are formed. When less pure starting material is used, the process may need to be modified to accommodate the lower purity starting materials.

It is an advantage of the present invention that $Ti_xAl_y(O)$ of high purity with limited and controllable amounts of $Al_2O_3$ present can be produced by a relatively low cost, environmentally friendly, method of manufacture. The process also adaptable to separation of other metals as referred to earlier. Using the milling and the separation process as described, experiments with copper oxide and aluminium, and yttrium oxide and aluminium have shown the applicability of these methods to separate other metal based composites, too. An optical analysis of the separation results in these cases confirmed a particle size differentiation between the components. Thus the basic principles of the process as specifically described for titanium also apply to separation of these metals for example.

It is also an advantage of the present invention that the separation technique does not utilise any environmentally restricted materials such as chlorine and the like.

It is also an added advantage of the present invention that the cost of high purity $Ti_3Al$ is significantly reduced in comparison with current existing production costs for $Ti_3Al$.

The term 'component' in accordance with the present invention should be understood to mean a phase that makes up part of a metal-based composite. While it should be appreciated that there is at least two components in a metal based composite, there is theoretically no limit to the number of components that make up metal based composite.

EXAMPLES

The steps detailed below utilise as a starting material, the $Al/TiO_2$ composite powder formed by the method of manufacture as disclosed in U.S. Pat. No. 6,264,719 and disclose the method of producing high purity TiAl alloy or $Ti_xAl_y$ intermetallic compounds with $Al_2O_3$ in low and controlled concentrations.

The starting material used in the process is $TiO_2$ powder, Al powder and other metal oxides or metal oxide powders, require a purity level of at least 98.5% to ensure the purity of the titanium alloys produced have the desired quality.

Step 1: Reaction Sintering of the $Ti_xAl_y(O)/Al_2O_3$ Bulk Composite

The $Al/TiO_2$ composite powder produced using the method disclosed in U.S. Pat. No. 6,264,719 is pressed into a compact. The mole ratio between Al and $TiO_2$ can be controlled according to one of the following nominal expressions:

$$4/3\ Al + TiO_2 \rightarrow Ti + 2/3\ Al_2O_3 \quad (1)$$

$$5/3\ Al + TiO_2 \rightarrow 1/3\ Ti_3Al + 2/3\ Al_2O_3 \quad (2)$$

$$7/3\ Al + TiO_2 \rightarrow TiAl + 2/3\ Al_2O_3 \quad (3)$$

The compact is heated to a temperature sufficiently high to ignite the composite reaction between the Al and the $TiO_2$, forming $Ti_xAl_y(O)$ including Ti(Al,O) and $Al_2O_3$. The heating and combustion reaction also causes sintering of the powder compact into a bulk $Ti_xAl_y(O)/Al_2O_3$ composite. The temperature required for ignition is 700° C.

Alternatively, the $Al/TiO_2$ composite powder can be heated to a temperature above 700° C. to allow the ignition of the combustion reaction between Al and $TiO_2$ forming $Ti_xAl_y(O)/Al_2O_3$ composite powder.

The $Ti_xAl_y(O)/Al_2O_3$ composite powder can be pressed into a compact and sintered into a bulk $Ti_xAl_y(O)/Al_2O_3$ by holding the compact at 1550° C. for two hours.

Step 2: Method of Coarsening of $Al_2O_3$ Particle Size

The $Ti_xAl_y(O)/Al_2O_3$ bulk composite is heated to 1650° C. and is held at this temperature for 4 hours to cause the $Al_2O_3$ particles in the $Ti_xAl_y(O)/Al_2O_3$ composite to be significantly coarsened, as shown in FIG. 1. The size of the $Al_2O_3$ particles should be in the range of 15-100 μm. The heating rate is 5° C./minute.

It should be appreciated that sometimes it might be advantageous to combine step 1 and step 2.

Step 3: Preparation of the Composite for Separation

Crush and mill the $Ti_xAl_y(O)/Al_2O_3$ composite with coarsened microstructure using a mechanical mill under argon or other inert atmosphere including a vacuum. The milling time should be about 20 minutes. The milling condition needs to be controlled in such a way that the composite microstructure is broken into discrete $Al_2O_3$ and $Ti_xAl_y(O)$ powder particles. The milling should not be too long and the reduction of the $Al_2O_3$ particle size should be prevented. The size of the powder particles is in the range of 0.5-100 μm. The powder contains 40-60% of $Al_2O_3$ depending on the $Al/TiO_2$ mole ratio in the starting powder.

Step 4: Addition of a Surfactant to the Powder and Production of the Slurry

The $Ti_xAl_y(O)/Al_2O_3$ powder produced from step 3 is further mixed with water and surfactant at a ratio of 1 g of powder to 10 ml of water and 0.1 g of surfactant in a mechanical mill. The surfactant is sodium dodecyl sulphate. The milling time is 30 minutes, or sufficiently long to coat the powder particles surface with water and the surfactant molecules. At the end of this step a slurry is produced.

Step 5: Separation of the Slurry

The slurry from step 4 is mixed with a large quantity of water to make a suspension with a powder concentration of approximately 10 g/liter. The suspension is then poured into a column with a height of 5 m. After a time of one hour, the suspension is separated from the liquid using a typical solid-liquid separation method such as filtering or centrifugal separation. The powder produced is called B1 powder. In the meantime, sediment at the bottom of the column is also taken out of the column and filtered. The powder produced from the sediment is called the B2 powder. B1 powder, which accounts for typically 30-50% of the total starting powder, contains 20-40% $Al_2O_3$. B2 powder, which accounts for typically 50-70% of the total starting powder contains 70-85% $Al_2O_3$.

B1 powder has a particle size typically in the range of 0.5-10 µm, while the B2 powder has a particle size typically in the range of 5-100 µm.

Step 6: Further Separation of Low $Al_2O_3$ Powders

B1 powder is compacted by using mechanical press and the material goes through step 1 to step 5 again to produce B3 and B4 powders. B3 powder is from the suspension and contains a lower volume fraction of $Al_2O_3$ than the B1 powder. The volume fraction of $Al_2O_3$ articles in the B3 powder is in the range of 15-25%. B4 is the by-product of the process. B1 to B4 powders are all valuable in their own right.

Steps 1 to 5 may be repeated more than once to produce B5 and B6 or further refined powders.

Step 6a: Extraction of Titanium Rich Powder from Suspension

The B1 or B3 powder produced from step 5 is mixed with surfactant and water to produce a suspension with a solid concentration of approximately 10 g/liter. The titanium rich powder is then extracted from the suspension by using either a method of electrophoresis or magnetic separation.

Step 7: Addition of Calcium Hydride to Reduce the Oxygen Content in the Titanium Rich Powder Once the volume fraction of the $Al_2O_3$ in the $Ti_xAl_y(O)$ rich powder has been reduced to below 30% the powder can then be mixed with calcium hydride and heated to 1100° C. to facilitate the reaction between $Al_2O_3$ and calcium hydride to eliminate $Al_2O_3$, and between $Ti_xAl_y(O)$ and calcium hydride to reduce the oxygen content in the $Ti_xAl_y(O)$ phase to below 1.5 atomic percent. As a by product of the reaction, the CaO and $3CaO.Al_2O_3$ phase can then be leached out by using mild acids such as formic and acetic acids.

Step 7a: Addition of Y and Ce to the Titanium Rich Powder

Alternatively, once the volume fraction of the $Al_2O_3$ in the $Ti_xAl_y(O)$ rich powder is below 10%, the powder will be mixed with rare earth metals such as yttrium(Y) and cerium (Ce) to react with $Al_2O_3$ and $Ti_xAl_y(O)$ to form composites consisting of $Ti_xAl_y$ with a low dissolved oxygen content (<1 at %) and the particles of rare earth metals.

Times of processing methods (based on upscaling the basic research work) were as follows:

1 High energy mechanical milling (Discus Mill) time was 2 hours for 250 g of $Al/TiO_2$.
2 Heat-treatment timing was 3 hours at high temperature such as 1500-1600° C. for the pressed milled product powder. After this heat treatment the intermediate product powder will be $Ti_3Al(O)/Al_2O_3$ with high volume fraction of $Al_2O_3$.
3 Crushing of the pellets time was 10 min (in discus milling machine).
4 Wet milling the $Ti_3Al(O)/Al_2O_3$ with high volume fraction of $Al_2O_3$ for 30 minutes in order to disaggregate the $Ti_3Al(O)$, and $Al_2O_3$ particles and prevent them from reaggregating again
5 The wet milled powder is placed in a large scale sedimentation column for 2 hours as settling time. After that decant the top fraction of the sedimentation column containing the $Ti_3Al(O)/Al_2O_3$ with low volume fraction of $Al_2O_3$. The amount of this material is about 50% of the total powder in the first stage.
6 Metal hydride reduction 4 hours at high temperature of the $Ti_3Al(O)/Al_2O_3$ with low volume fraction of $Al_2O_3$ in order to achieve different kinds of titanium alloys. We can control this chemical processing to achieve either $Ti_3Al/TiAl$ or $TiAl/Ti_3Al$ or any other titanium alloys depending on the starting constituents.
7 Washing 4 hours in order to get rid of the by product materials.

This separation technique we have developed is a unique technique tool to separate different material particles, which have some particle agglomeration barrier. It does not matter whether they are of close or different densities. With different densities wet milling will help to disaggregate the particles then separate the particles within the slurry using sedimentation column. When there is little difference in the densities, heat treatment will coarsen the particles, then by crushing we can achieve particle differentiation between different phases particles. This was what happened between $Ti_3Al(O)$, and $Al_2O_3$ particles.

To produce 1 kg of pure titanium alloy we need 3.3 Kg of the $Ti_3Al(O)/Al_2O_3$ with high volume fraction of $Al_2O_3$ (which is the product of the heat treatment of the $Al/TiO_2$) in this case we can say we need 2.24 kg of $TiO_2$ and 1.06 kg of Al powder to mill then followed by heat treatment.

The final $TiAl/Ti_3Al$ product is a titanium aluminium alloy with little or no $Al_2O_3$ phase. Different analysis techniques, such as X-ray diffractometry, SEM (Scanning electron microscopy), EDX analysis and X-ray mapping confirm this. Powder combustion analysis using Leco equipments confirm that this titanium alloy also has a low oxygen content (down to about 0.8 wt %).

While in the foregoing description there has been made reference to specific components or integers of the invention having known equivalents then such equivalents are herein incorporated as if individually set forth.

Although this invention has been described by way of example only and with reference to possible embodiments thereof it is to be understood that modifications or improvements may be made without departing from the scope or spirit of the invention, as defined in the appended claims.

The invention claimed is:

1. A method of recovering a metal rich fraction from a metal-ceramic based composite, the method including the steps of increasing the size of at least a ceramic component within the metal-ceramic based composite by heating the metal-ceramic based composite, crushing the metal-ceramic based composite to reduce the size of the metal rich fraction in the composite in comparison to the ceramic component in the composite, and then separating the reduced sized metal rich fraction from the increased sized ceramic component to result in a metal rich fraction in powder form having a volume fraction of metal that is greater than about 60%, wherein separation of the components is achieved by sedimentation, electrophoresis, electrostatic methods, magnetic separation, or chemical leaching.

2. The method according to claim 1 wherein the metal based composite is heated to a temperature of between about 1500° C. and about 1650° C.

3. The method according to claim 1 wherein the metal based composite is held at a temperature of between 1500° C. and 1650° C. for a time of between about 0.5 hours and about 10 hours.

4. The method according to claim 1 wherein the metal is titanium, yttrium or copper.

5. The method according to claim 1 wherein the metal-ceramic based composite includes metallic phases, intermetallic phases, oxides, nitrides, carbides or silicates.

6. The method according to claim 5 wherein the metallic phases, intermetallic phases and oxides include $Ti(Al,O)$, $Ti_3Al(O)$ and $TiAl(O)$ and $Al_2O_3$.

7. The method according to claim 1 wherein the ceramic component that increases in size is $Al_2O_3$.

8. The method according to claim 7 wherein the mean particle size of the $Al_2O_3$ is increased by the heat treatment which brings about coarsening of the $Al_2O_3$ particles.

9. The method according to claim 1 wherein the metal-based ceramic composite is crushed and milled following heat treatment to form the powder.

10. The method according to claim 9 wherein the crushing or crushing and milling occurs in an inert environment under argon or a vacuum.

11. The method according to claim 9 wherein the crushing time or crushing and milling time is limited to minimize reduction of the size of the increased size ceramic component.

12. The method according to claim 1 wherein the powder is mixed with surfactant and water to produce a suspension for separation.

13. The method according to claim 12 wherein the surfactant comprises sodium dodecyl sulphate.

14. The method according to claim 1 wherein the volume fraction is greater than about 90%.

15. The method according to claim 1 wherein the metal rich fraction collected following separation is reacted with a reducing agent.

16. The method according to claim 1 wherein the oxygen content of the metal rich fraction is less than about 1.5 atomic %.

17. A method of recovering a metal rich fraction from a metal-ceramic based composite, the method including the steps of increasing the size of particles of at least a ceramic component within the metal-ceramic based composite by heating the metal-ceramic based composite, crushing the metal-ceramic based composite to reduce the size of the metal rich fraction in the composite in comparison to the ceramic component in the composite, separating the reduced sized metal rich fraction from the increased sized ceramic component to result in a metal rich fraction in powder form having a volume fraction of metal that is greater than about 60%, reacting the metal rich fraction with a reducing agent, and leaching the metal rich fraction with an acid to remove products of the reduction reaction.

18. The method according to claim 17 wherein after crushing the metal-ceramic based composite to reduce the size of the metal rich fraction in the composite in comparison to the ceramic component of the composite, a suspension of the crushed composite is prepared, and wherein the suspension comprises a surfactant.

19. The method according to claim 17 wherein the metal based composite is heated to a temperature of between about 1500° C. and about 1650° C.

20. The method according to claim 17 wherein the metal based composite is held at a temperature of between 1500° C. and 1650° C. for a time of between about 0.5 hours and about 10 hours.

21. The method according to claim 17 wherein the metal is titanium, yttrium or copper.

22. The method according to claim 17 wherein the metal-ceramic based composite includes metallic phases, intermetallic phases, oxides, nitrides, carbides or silicates.

23. The method according to claim 22 wherein the metallic phases, intermetallic phases and oxides include Ti(Al,O), $Ti_3Al(O)$ and TiAl(O) and $Al_2O_3$.

24. The method according to claim 17 wherein the ceramic component that increases in size is $Al_2O_3$.

25. The method according to claim 24 wherein the mean particle size of the $Al_2O_3$ is increased by the heat treatment which brings about coarsening of the $Al_2O_3$ particles.

26. The method according to claim 17 wherein the metal-based ceramic composite is crushed and milled following heat treatment to form the powder.

27. The method according to claim 26 wherein the crushing or crushing and milling occurs in an inert environment such as under argon or a vacuum.

28. The method according to claim 26 wherein the crushing time or crushing and milling time is limited to minimize reduction of the size of the increased size ceramic component.

29. The method according to claim 17 wherein separation of the components is achieved by sedimentation, electrophoresis, electrostatic methods, chemical leaching, or magnetic separation.

30. The method according to claim 17 wherein the volume fraction is greater than about 90%.

31. The method according to claim 17 wherein the oxygen content of the metal rich fraction is less than about 1.5 atomic %.

32. The method according to claim 17 wherein the reducing agent comprises calcium or calcium hydride.

33. The method according to claim 17 wherein the acid comprises formic acid or acetic acid.

34. A method of recovering a metal rich fraction from a metal-ceramic based composite, the method including the steps of increasing the size of particles of at least a ceramic component within the metal-ceramic based composite by heating the metal-ceramic based composite, crushing the metal-ceramic based composite to reduce the size of the metal rich fraction in the composite in comparison to the ceramic component in the composite, and separating the reduced sized metal rich fraction from the increased sized ceramic component to result in a metal rich fraction in powder form having a volume fraction of metal that is greater than about 60%, wherein separation of the components is achieved by a method that includes electrophoresis or magnetic separation.

35. The method according to claim 34 wherein the metal based composite is heated to a temperature of between about 1500° C. and about 1650° C.

36. The method according to claim 34 wherein the metal based composite is held at a temperature of between 1500° C. and 1650° C. for a time of between about 0.5 hours and about 10 hours.

37. The method according to claim 34 wherein the metal is titanium, yttrium or copper.

38. The method according to claim 34 wherein the metal-ceramic based composite includes metallic phases, intermetallic phases, oxides, nitrides, carbides or silicates.

39. The method according to claim 38 wherein the metallic phases, intermetallic phases and oxides include Ti(Al,O), $Ti_3Al(O)$ and TiAl(O) and $Al_2O_3$.

40. The method according to claim 34 wherein the ceramic component that increases in size is $Al_2O_3$.

41. The method according to claim 40 wherein the mean particle size of the $Al_2O_3$ is increased by the heat treatment which brings about coarsening of the $Al_2O_3$ particles.

42. The method according to claim 34 wherein the metal-based ceramic composite is crushed and milled following heat treatment to form the powder.

43. The method according to claim 42 wherein the crushing or crushing and milling occurs in an inert environment such as under argon or a vacuum.

44. The method according to claim 42 wherein the crushing time or crushing and milling time is limited to minimize reduction of the size of the increased size ceramic component.

45. The method according to claim 44 wherein the volume fraction is greater than about 90%.

* * * * *

UNITED STATES PATENT AND TRADEMARK OFFICE
CERTIFICATE OF CORRECTION

PATENT NO.       : 7,585,457 B2
APPLICATION NO.  : 10/522054
DATED            : September 8, 2009
INVENTOR(S)      : Zhang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 495 days.

Signed and Sealed this

Fourteenth Day of September, 2010

David J. Kappos
*Director of the United States Patent and Trademark Office*